United States Patent [19]

Hansen

[11] Patent Number: 4,469,117
[45] Date of Patent: Sep. 4, 1984

[54] VALVE DEVICE FOR THE PREVENTION OF THE OVERFILLING OF PORTABLE CONTAINERS, PARTICULARLY GAS CYLINDERS

[75] Inventor: Frits P. U. Hansen, Rungsted Kyst, Denmark

[73] Assignee: Kosan Teknova A/S, Niva, Denmark

[21] Appl. No.: 493,215

[22] Filed: May 10, 1983

[30] Foreign Application Priority Data

May 17, 1982 [DK] Denmark .............................. 2224/82

[51] Int. Cl.³ .................... F16K 17/36; F16K 31/20
[52] U.S. Cl. ........................................ 137/39; 137/45; 137/389; 137/614.17; 141/213; 141/216
[58] Field of Search ................ 137/38, 39, 45, 614.17, 137/43, 389; 141/213, 216

[56] References Cited

U.S. PATENT DOCUMENTS

2,082,723  6/1937  Seward .................................. 137/45
3,916,928  11/1975  Enoch .................................... 137/39

FOREIGN PATENT DOCUMENTS

2386749  11/1978  France .................................. 137/43

Primary Examiner—Robert G. Nilson
Attorney, Agent, or Firm—Anthony A. O'Brien

[57] ABSTRACT

A valve device serving to prevent overfilling of portable containers, particularly liquid gas cylinders, includes a ball which is freely rotatable relative to a spherical seating face in a casing having a filling channel extending to said seating face. The ball has a through passage which in the prescribed filling position communicates with the channel, and the ball is connected to a load member tending to keep the ball, and thus its passage, in a given orientation so that the communication is broken when the container is tilted away from the prescribed filling position.

The device further includes a valve member controlled by a float and operative to interrupt the filling operation after a predetermined filling level has been reached in the container.

3 Claims, 2 Drawing Figures

VALVE DEVICE FOR THE PREVENTION OF THE OVERFILLING OF PORTABLE CONTAINERS, PARTICULARLY GAS CYLINDERS

BACKGROUND OF THE INVENTION

When containers are to be filled with liquid gas it is essential that filling be stopped at an appropriately early stage so that the liquid gas occupies only part of the container space, usually about 80% of its total volume. Failing this, there is a considerable risk that the cylinder will explode, if it is subjected to heating, even if only to a relatively moderate degree.

For this purpose it is customary to perform the filling process through a channel with a valve connected to a float so as to be closed when the liquid in the cylinder has reached the prescribed, highest level. It is, however, conditional to the closing of the valve at the correct stage that the gas cylinder is in an upright position during filling, since a slanting position can cause the float to react too early or too late. From the point of view of safety, too early closing of the valve cannot, of course, cause any damage, whereas if the valve closes at too late a stage the result may be dangerous overfilling. A customer or consumer would normally not be aware of this risk, but he would, on the other hand, soon discover that if the cylinder is tilted or held at an angle in a certain direction it is possible to fill an extra amount of gas into the cylinder, and the customer will naturally be tempted to take advantage of this possibility, especially if payment is fixed for "a charge", regardless of the amount filled.

The risk of overfilling can be obviated when filling takes place at an authorized filling station, as special safety devices can be installed to prevent all filling, unless the cylinder is fixed in the correct filling position, but for one thing such safety devices can—intentionally or unintentionally—be put out of action, and for another gas filling often takes place in completely unsupervised conditions, e.g. from a large gas tank installed on customer's premises.

A purpose of the invention is to provide a valve device which in all circumstances may prevent overfilling of liquid gas cylinders, but it should be noticed that the basic principles of this valve device may also be utilized in other connections where it is required to interrupt a fluid flow, e.g. the flow of powder or granular material into a portable container, after the level of the amount filled into the container has reached a pre-stipulated height.

SUMMARY OF THE INVENTION

The valve device of the invention is operative to prevent overfilling of portable containers, particularly liquid gas cylinders by automatically interrupting the fluid flow through a filling channel both when a predetermined filling level has been reached in the container and when the container deviates from a prescribed filling position which it must occupy in order that a liquid level controlled valve member operates as intended.

The term "prescribed filling position" does not necessarily denote an exactly defined position, such as an absolutely vertical position for a liquid gas cylinder, since a certain deviation, e.g. as much as 10°–15°, would in practice be an acceptable margin without jeopardizing the desired safety against overfilling.

The valve member controlled by the liquid level in the container may be of a well-known type and is combined with a ball that is freely rotatably seated in the casing of the valve device and is loaded by a weight tending to always keep the ball in a given orientation, regardless of the position of the container. In the "prescribed filling position" referred to above, a passage extending through the ball communicates with the filling channel provided in the casing of the valve device but when the container is tilted away from said position, the communication is interrupted because the ball does not change its orientation and, thus, is rotated relative to the valve casing with the filling channel.

ACKNOWLEDGEMENT OF PRIOR ART

Spherical closure valves based on the same principle are known for special purposes. Thus, U.S. Pat. No. 2,082,723 discloses such a valve which under certain conditions shall establish communication from a fuel tank to the atmosphere and under other conditions shall prevent such communication.

PREFERRED SECONDARY FEATURES OF THE INVENTION

The float may be associated with the load in the way that the valve body is connected to one end of a lever which at its other end carries the float and intermediate its ends is supported by a rod connecting the ball with its load, but another and less complicated possibility is that the load itself forms a float and is carried by a rod which is mounted for displacement in the passage of the ball and on which the valve body is provided. In both cases the complete valve device may be as compact that it can be installed in a normal liquid gas cylinder spout having an internal diameter of about 25 mm.

DETAILED DESCRIPTION OF THE PREFERRED EMBODIMENTS

Figure 1:
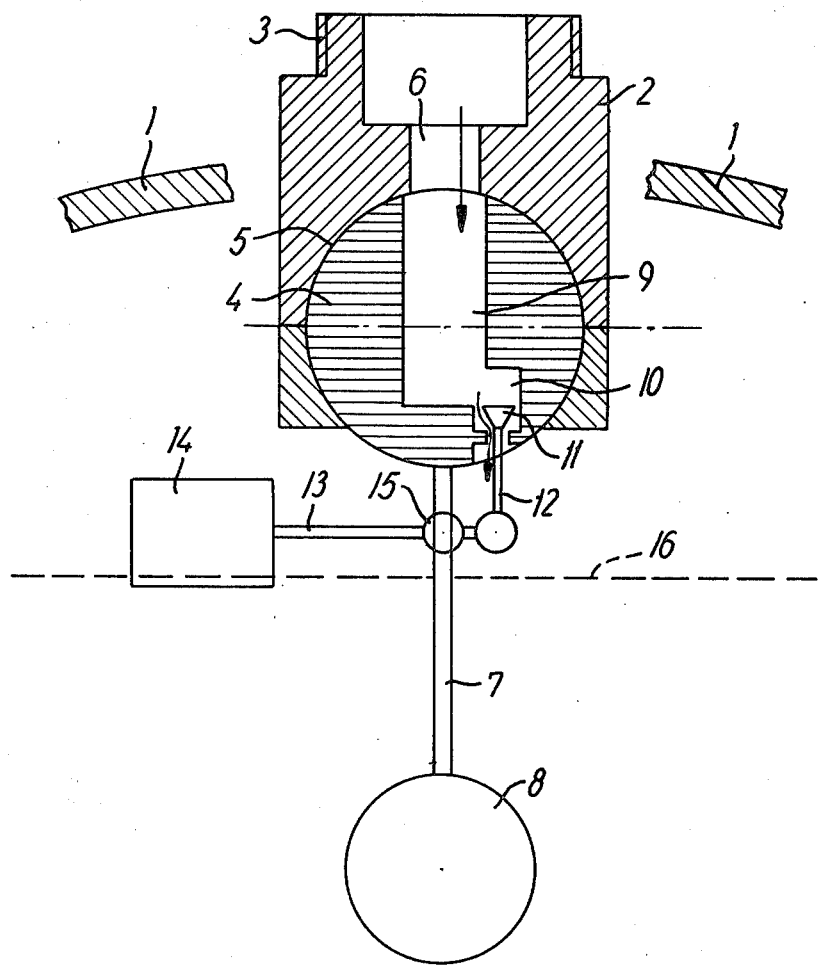
FIG. 1 is a vertical section of a first embodiment of the invention mounted in the top of a liquid gas cylinder only indicated by parts of its top wall.

Reference numeral 1 in FIG. 1 indicates part of the top wall of an ordinary liquid gas cylinder in which a spout 2 is fastened in a manner not particularly shown. The spout is threaded at 3 so that it can be coupled to a hose from a liquid gas store, and the spout forms a casing in which a freely rotatable ball 4 is seated against a spherical surface 5 and which presents a filling channel 6 ending in the surface 5. Through a rod 7 the ball 4 is connected to a load member 8 tending to keep the ball in a given orientation independent of the orientation of the cylinder 1. On the drawing it is assumed that this cylinder is standing or suspended in a substantially vertical position, and in this situation the fluid filling channel 6 communicates with an open passage 9 provided in the ball 4. A laterally offset portion 10 of the passage houses a valve member 11 which through a rod 12 is connected to one end of a lever 13 carrying a float 14 at its other end and supported at an intermediate point in a bearing 15 in the connection rod 7 between the ball 4 and the load member 8. The dotted line 16 indicates the liquid level in the gas cylinder 1 just before the end of the filling operation. When the level is raised a bit further, the float 14 will also move upwards so as to draw the valve member 11 downwardly into close contact with an associated valve seat in the bottom of the side chamber 10 whereby further filling will be prevented.

The closing of the valve member 11 could be delayed by a clockwise tilting of the liquid gas cylinder 1 but in such case the load 8 causes the ball 4 to rotate or tilt relative to the spout or casing 2 such that the communication between the channel 6 and the passage 9 is interrupted which means that the filling operation is stopped.

Figure 2:
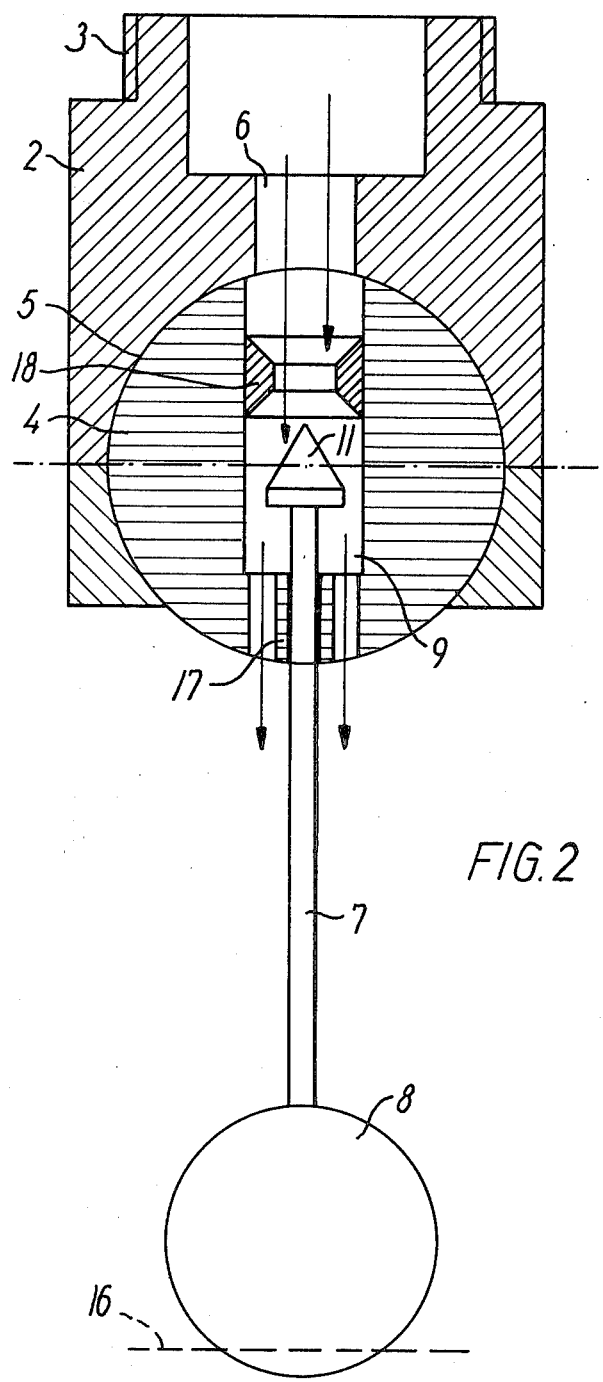
FIG. 2 is a similar illustration of a second embodiment of the valve device.

In FIG. 2 the reference numerals from FIG. 1 are used for similar or analogous elements. The main difference from FIG. 1 is that the load member 8 in FIG. 2 is itself designed as a float, when submerged in the liquid gas, and is displaceably connected to the ball 4, the rod 7 being held in a guide sleeve 17 in the lower end of the passage 9 of the ball. Above this guide the rod 7 carries the valve member 11 which cooperates with a valve seat 18 in the passage 9 and is closed thereagainst when, due to a rising liquid level 16, the load member 8 is displaced upwardly in the guide 17.

For the sake of completeness it should be noticed that the prevention of further filling must not necessarily be total. Thus, the valve members 11 may have a discharge passage the throughflow capacity of which corresponds to the normal consumption and is, of course, much smaller than the throughflow capacity required for the filling operation. Further, in the embodiment of FIG. 2 it is also possible for the valve member 11 to cooperate with a regulator so as to be automatically opened for gas discharge when the regulator is fixed in place for which purpose the thread 3 may also be used.

I claim:

1. A valve device to prevent overfilling of portable containers, particularly liquid gas cylinders, comprising a casing having a spherical surface and a fluid filling channel opening in said spherical surface, a valve member for automatically obstructing the filling flow when a predetermined level has been reached in the container, a freely rotatable ball resting against said spherical surface, a passage extending through said ball, and a load member associated with the ball and extending downwardly therefrom to normally hold the ball in such a position relative to said casing that during the filling operation said passage communicates with said fluid filling channel only when said container is held in a prescribed filling position, said valve member being housed in said passage and being operatively connected to a float associated with said load member.

2. A valve device according to claim 1, wherein said valve member is connected to one end of a lever which at its other end carries said float and intermediate its ends is supported by a rod connecting the ball with its load member.

3. A valve device according to claim 1, wherein said load member itself forms a float and is carried by a rod mounted for displacement in said ball passage and carrying said valve member.

* * * * *